United States Patent [19]

Madnick et al.

[11] Patent Number: 5,953,716
[45] Date of Patent: *Sep. 14, 1999

[54] QUERYING HETEROGENEOUS DATA SOURCES DISTRIBUTED OVER A NETWORK USING CONTEXT INTERCHANGE

[76] Inventors: Stuart E. Madnick, 55 Lee St., Brookline, Mass. 02146; Michael D. Siegel, 26 Maple Ave., Cambridge, Mass. 02139

[*] Notice: This patent issued on a continued prosecution application filed under 37 CFR 1.53(d), and is subject to the twenty year patent term provisions of 35 U.S.C. 154(a)(2).

[21] Appl. No.: 08/657,750

[22] Filed: May 30, 1996

[51] Int. Cl.$^6$ ................................................. G06F 17/30
[52] U.S. Cl. ................................................ 707/4; 707/2
[58] Field of Search .................. 707/4, 3, 2; 395/200.6, 395/500

[56] References Cited

U.S. PATENT DOCUMENTS

| | | | |
|---|---|---|---|
| 5,278,978 | 1/1994 | Demers et al. | 707/101 |
| 5,345,586 | 9/1994 | Hamala et al. | 395/650 |
| 5,416,917 | 5/1995 | Adair et al. | 395/500 |
| 5,550,971 | 8/1996 | Brunner et al. | 707/3 |
| 5,590,319 | 12/1996 | Cohen et al. | 707/4 |
| 5,634,053 | 5/1997 | Noble et al. | 707/4 |
| 5,740,421 | 4/1998 | Palmon | 707/4 |

OTHER PUBLICATIONS

Siegel, et al. "Using Semantic Values to Facilitate Interoperability Among Heterogeneous Information Systems", Working Paper, Alfred P. Sloan School of Management, Massachusetts Institute of Technology, Feb. 1993.

Kay, Roger L., "What's the meaning of this?!", *Computerworld*, pp. 89–93 (1994).

Daruwala, et al. "The Context Interchange Network Prototype", *Sixth IFP TC–2 Working Conferences on Data Semantics (DS–6)*, Massachusetts Institute of Technology, The Sloan School of Management, May 1995.

Goh, C.H. et al. "Ontologies, Contexts, and Mediation: Representing and Reasoning about Semantics Conflicts in Heterogeneous and Autonomous Systems", Working Paper, MIT Sloan School of Management, Aug. 1995.

(List continued on next page.)

*Primary Examiner*—Meng-Ai T. An
*Assistant Examiner*—Walter D. Davis, Jr.
*Attorney, Agent, or Firm*—Testa, Hurwitz&Thibeault,LLP

[57] ABSTRACT

A system for querying disparate, heterogeneous data sources over a network includes a request translator and a data translator. The request translator translates a request having an associated data context declared by the requester into a query having a second data context associated with it. The second context is also associated with, and is declared by, at least one of the disparate data sources. This system also includes a data translator, which translates received data from the data context declared by the data source queried into the data context associated with the request. A related method for querying disparate data sources over a network is also described, which includes the steps of translating a request having an associated data context into a query having a second data context, which is associated with one of the disparate data sources to be queried and translating data received from the data sources from the data contexts associated with the data sources into the data context associated with the request.

38 Claims, 6 Drawing Sheets

OTHER PUBLICATIONS

Madnick, S. et al. "Using Knowledge About Data to Integrate Disparate Sources", Intelligent Integration of Information ($I^3$) Workshop, Sloan School of Management, Massachusetts Institute of Technology, San Diego, California, Jan. 9–12, 1996.

Daruwala et al,. "The Context Interchange Network", Database Applications Semantics, Proceedings of the IFIP WG 2.6 Working Conference on Database Applications Semantics (DS–6), Stone Mountain, Atlanta, Georgia, U.S.A., May 30–Jun. 2, 1995, pp. 65–91.

Tomasic et al., "Scaling Heterogeneous Databases and the Design of Disco", Proceedings of the 16th International Conference on Distributed Computing Systems, Hong Kong, May 27–30, 1996, pp. 449–457.

Tomasic et al., "The Distributed Information Search Component (Disco) and the World Wide Web", ACM Sigmod International Conference on Management of Data, Tucson, Arizona, U.S.A. May 13–15, 1997, pp. 546–548.

Woelk et al., "InfoSleuth: Networked Exploitation of Information Using Semantic Agents", Digest of Papers of the Computer Society Computer Conference (Spring) Compcon, Technologies for the Information Superhighway, San Francisco, California, Mar. 5–9, 1995, pp. 147–152.

QUERYING HETEROGENEOUS DATA SOURCES DISTRIBUTED OVER A NETWORK USING CONTEXT INTERCHANGE

GOVERNMENT RIGHTS

This invention was made with government support under Contract No. F30602-93-C-0160 awarded by the United States Air Force. The government has certain rights in the invention.

TECHNICAL FIELD

The present invention relates to querying heterogeneous data sources and, more particularly, querying heterogeneous data sources distributed over a network and automatically converting data exchanged between source and receiver.

BACKGROUND INFORMATION

Every data source or data receiver makes a number of assumptions about the meaning of data. For data gathering or data exchange to be useful, individual systems must agree on the meaning of exchanged data. For example, one system may simplify database entries by storing a particular value in units of thousands, while another system or user seeking information may expect that same information to be in units of ones. A requesting system or user would find an answer returned in units of thousands meaningless; the two systems do not share the same assumptions about the provision of data values.

This problem is particularly acute for medium and large organizations, such as multinational corporations and government entities. These entities generally need to exchange information that is stored among many independent and diverse systems and databases within the organization. Similarly, the recent, rapid growth of the Internet, and especially the World Wide Web, has introduced individual users seeking to make use of the multitudinous, heterogeneous data sources to a similar problem.

A traditional method for dealing with differing assumptions about data is for either the data source, the receiver, or both the data source and the data receiver to provide a conversion routine. This approach scales poorly, however, since the total number of conversions increases proportionally to the square of the number of sources and receivers. Additionally, a source that is not accessed often by a particular receiver may not desire to provide a conversion routine for that receiver, making exchange of data with that source extremely difficult for users of that receiver.

It would be desirable to have an easily and efficiently scaleable system and method which represents the assumptions made about stored data and which provides meaningful data exchange between all sources and receivers.

SUMMARY OF THE INVENTION

The present invention allows for the explicit representation of source and receiver data context. Each source and receiver declares their data context, either before making or servicing a request for data or at the time of making or servicing a request for data. A set of context mediation services detects conflicts between data receiver contexts and data source contexts and automatically applies the appropriate conversions. The approach of the invention is scaleable and capable of evolving with the meanings of the data in the sources, as well as the meaning ascribed to data by data receivers, over time.

In one aspect, the invention involves a system for querying disparate, heterogeneous data sources over a network. The system includes a request translator and a data translator. The request translator either receives or generates a request which has an associated data context. In some embodiments, the data sources to be queried are specified by the request. In other embodiments, the request translator determines which data sources should be queried to satisfy the request, for example, by using an ontology. The request translator translates the request into a query having a data context matching that associated with the data sources to be queried. In some embodiments, the request is translated by detecting a difference between the data context associated with the request and the data context associated with a data source to be queried and then converting the data context associated with the request to the data context associated with the data source. This may be done with, for example, a pre-defined function, a look-up table, or a database query. In some embodiments, the request translator then optimizes the query for efficient execution. The data translator translates data received from the data source into the data context associated with the receiver.

In certain embodiments of this aspect of the invention, a query transmitter is provided which receives the request from the request translator and queries the disparate data sources. The query transmitter can optimize the query for efficient execution, and it may separate the query into a plurality of sub-queries and issue each sub-query separately to a different one of the disparate data sources.

In another aspect, the invention relates to a method for querying disparate data sources over a network. A request having an associated data context is translated into a query having a data context matching the data context associated with the data sources to be queried. Data received from the data sources is translated into the data context associated with the request.

In yet another aspect, the invention relates to an article of manufacture (e.g., a floppy disk, a CD ROM, etc.) with a computer-readable program stored thereon. The program is for querying disparate data sources over a network. A request having an associated data context is translated into a query having a data context associated with a data source to be queried, and received data is translated into the data context associated with the request. The translated request can be optimized.

BRIEF DESCRIPTION OF THE DRAWINGS

The invention is pointed out with particularity in the appended claims. The above and further advantages of this invention may be better understood by reference to the following description taken in conjunction with the accompanying drawings, in which:

DESCRIPTION

Figure 1A:
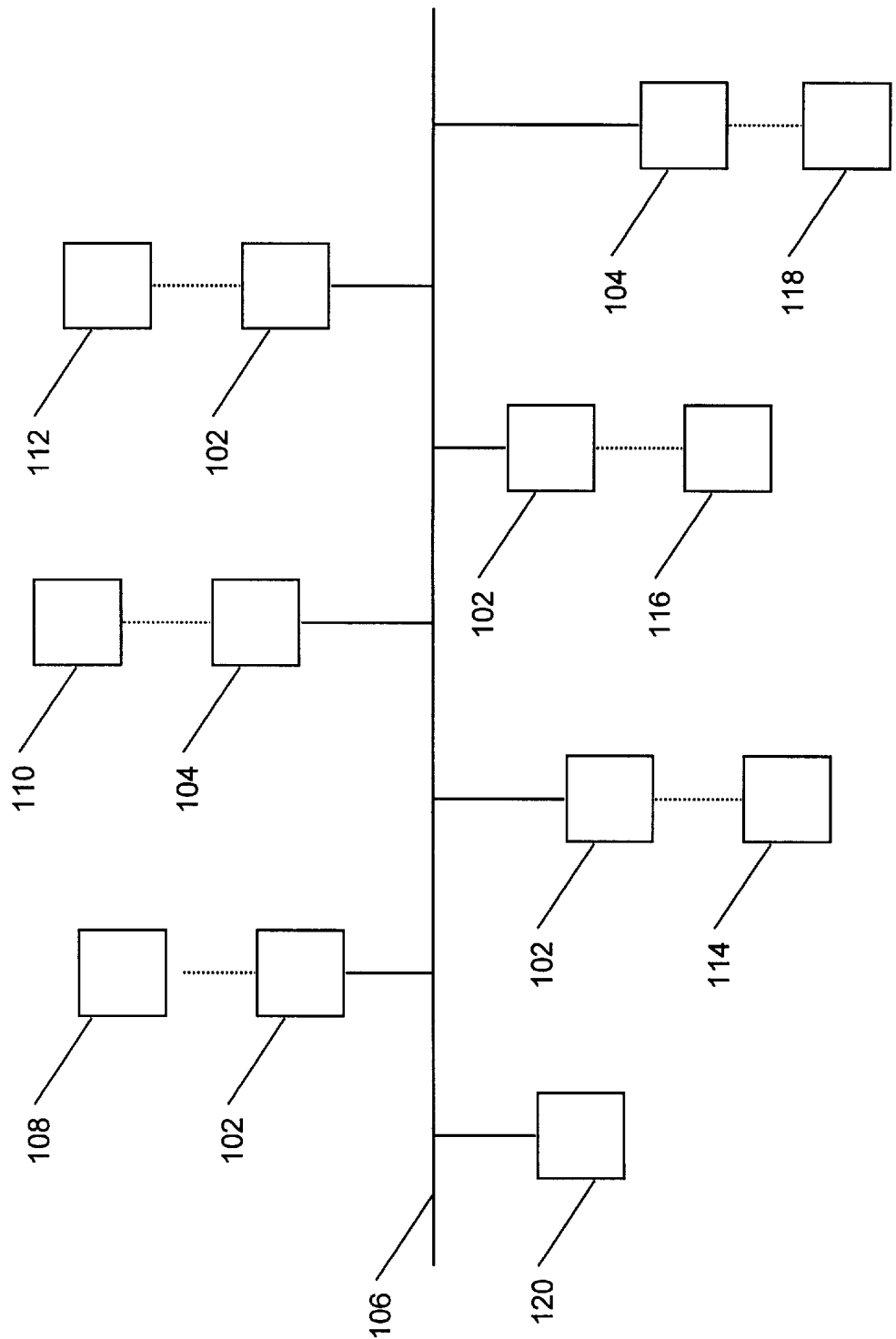
FIG. 1A is a diagram of an embodiment of a system according to the invention which includes data receivers and data sources interconnected by a network.
Figure 1B:
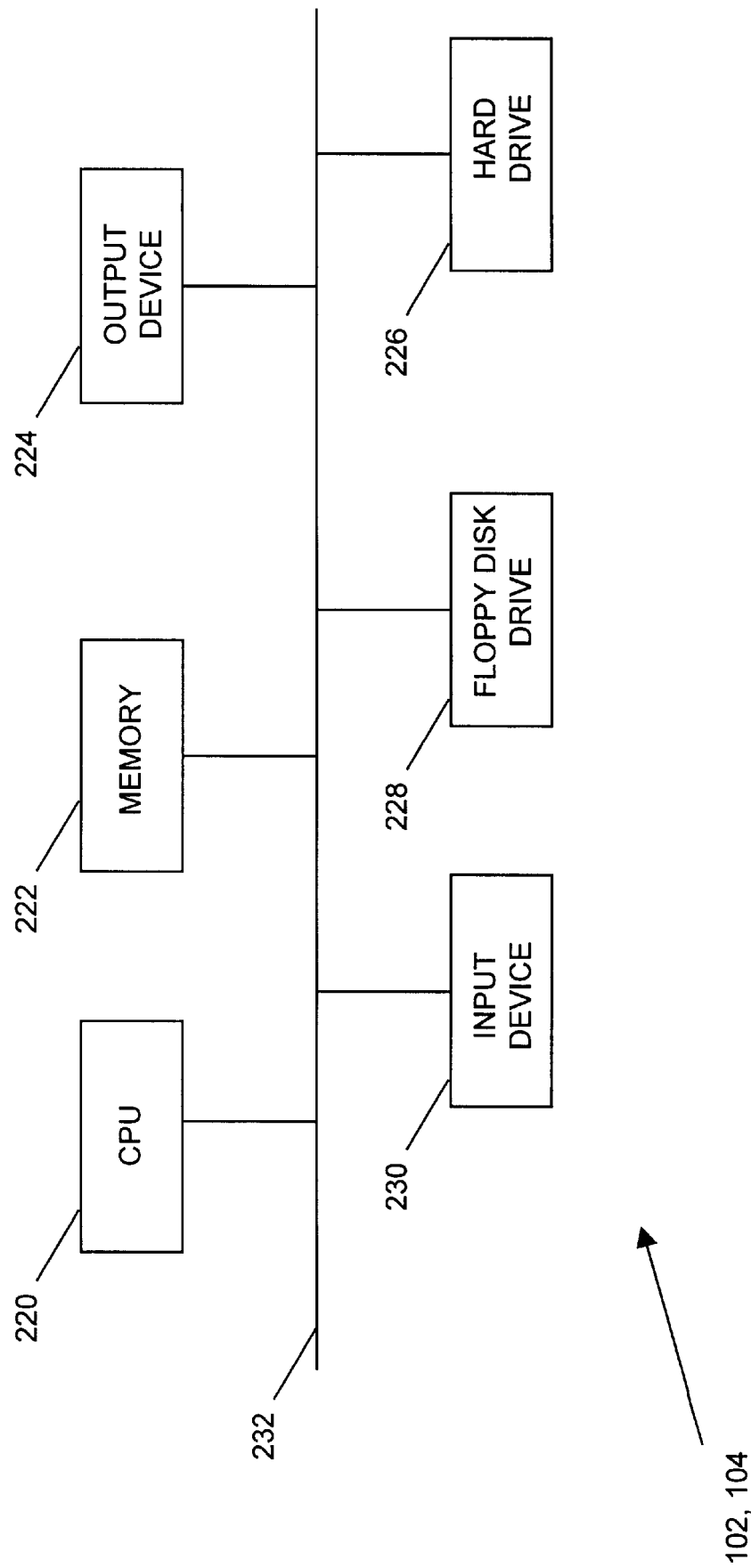
FIG. 1B is a simplified functional block diagram of a node as shown in FIG. 1A.

Referring to FIGS. 1A and 1B, data receivers 102 and data sources 104 are interconnected via a network 106. Although data receivers 102 are shown separate from data sources 104, any node connected to the network 106 may include the functionality of both a data receiver 102 and a data source 104.

Each of the nodes 102, 104 may be, for example, a personal computer, a workstation, a minicomputer, a mainframe, a supercomputer, or a Web Server. Each of the nodes 102, 104 typically has at least a central processing unit 220, a main memory unit 222 for storing programs or data, and a fixed or hard disk drive unit 226 which are all coupled by a data bus 232. In some embodiments, nodes 102, 104 include one or more output devices 224, such as a display or a printer, one or more input devices 230, such as a keyboard, mouse or trackball, and a floppy disk drive 228. In a preferred embodiment, software programs running on one or more of the system nodes define the functionality of the system according to the invention and enable the system to perform as described. The software can reside on or in a hard disk 226 or the memory 222 of one or more of the system nodes.

The data sources 104 preferably are databases or semi-structured Web pages, but they may be other types of structured or semi-structured sources of data. The network 106 to which the nodes 102, 104 are connected may be, for example, a local area network within a building, a wide-area network distributed throughout a geographic region, a corporate Intranet, or the Internet. In general, any protocol may be used by the nodes 102, 104 to communicate over the network 106, such as Ethernet or HTTP (Hypertext Transfer Protocol).

A set of assumptions regarding data is associated with each node 102, 104. That is, each node 102, 104 has an associated data context 108–118. For example, a particular data receiver 102 may always expect that when data is received, time values are in military time, monetary values are in thousands of U.S. dollars, and date values are returned in month-day-year format. This set of assumptions is the data context 108 of that particular data receiver 102. Another data receiver 102 may make a different set of assumptions about received data which are represented as its own data context 112. When a data receiver 102 makes a request for data, its data context 108, 112, 114, 116 is associated with the request. Similarly, each data source 104 provides the data context 110, 118 associated with its data.

The data context 108–118 of a node 102, 104 may be a file containing a list of data formats and associated meanings expected by that node 102, 104. For example, if a particular node 102, 104 expects to receive or provide data which it calls "net income " in units of dollars with a scale of thousands, that set of expectations may be specified in a file which represents at least a portion of the data context 108–118 associated with that node 102, 104. The data context 108, 112, 114, 116 of a data receiver 102 may be provided with each new request made by the data receiver 102. In one embodiment discussed in greater detail below, the data context 108–118 for each node 102, 104 may be stored in a central location through which all requests are routed for context mediation, or the data contexts 108–118 may be stored in a centralized manner. For example, the data contexts 108–118 may be stored as a directory of URL (Uniform Resource Locator) addresses which identify the location of each data context 108–118.

Figure 2:
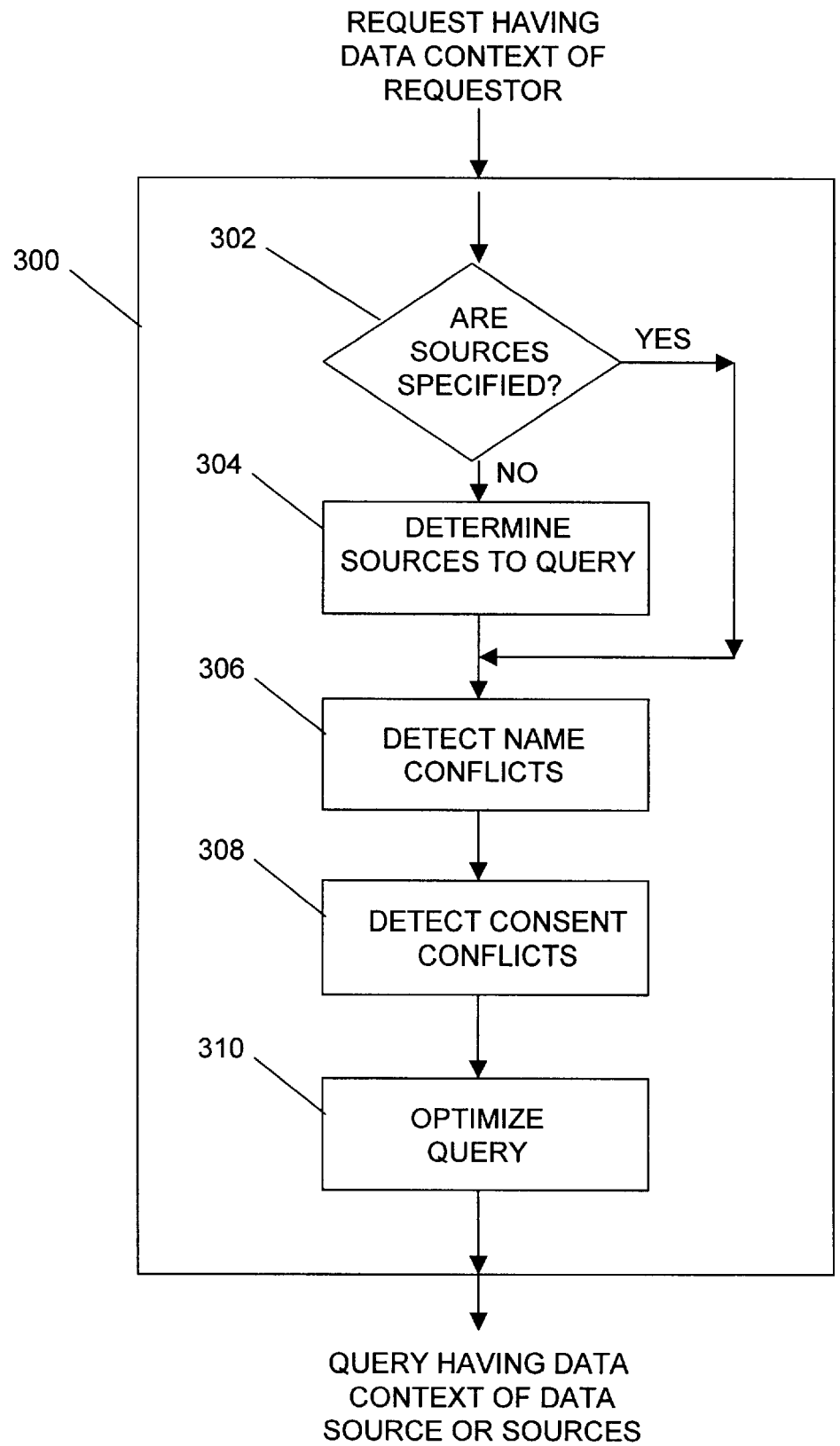
FIG. 2 is a flowchart of the steps taken by an embodiment of the request translator.

A request for data made by a data receiver 102 is associated with the data context 108, 112, 114, 116 of the data receiver 102. Referring to FIG. 2, one embodiment of a request translator 300 determines if the data context 108, 112, 114, 116 of the data receiver 102 is different from the data context 110, 118 of the data sources 104 that will be queried to satisfy the request. The request translator may be resident on the data receiver 102 making the request, or it may reside on another node 102, 104 attached to the network. In some embodiments, the request translator resides on a special purpose machine 120 which is connected to the network 106 for the sole purpose of comparing data contexts 108–118 and resolving conflicts between the data contexts 108–118 of data receivers 102 and data sources 104.

The request translator may be implemented as hardware or software and, for embodiments in which the request translator is implemented in software, it may be the software program that generates the request. Alternatively, the request translator may be a separate functional unit from the hardware or software used to generate the request, in which case the request translator receives the request as constructed by that hardware or software. For example, the request translator may be part of an SQL-query language application, or the request translator may receive requests made by an SQL-query language application, for example, a spreadsheet having embedded ODBC (Open Database Connectivity) commands.

The request translator may be provided with the identity of the data sources 104 to be queried (step 302). That is, the request may specify one or more data sources 104 to which the query should be directed. In these embodiments, the request translator compares the data context 118 of the data source 104 to the data context 108, 112, 114, 116 of the data receiver 102. If any conflicts are detected, e.g. the data source 104 expects to provide monetary values in hundreds of Japanese Yen and the data receiver 102 expects to receive monetary values in thousands of U.S. Dollars, the request translator translates the request to reflect the data context 108 of the data source 104. In other embodiments, the request translator is not provided with the identity of the data sources 104 to be queried, and the request translator may determine which data sources 104 to query (step 304). These embodiments are discussed in more detail below.

When the request translator is translating the data request made by the data receiver 102, it must detect conflicts between the names by which data are requested and provided (step 306), and it must detect the context of that data (step 308). For example, a data receiver 102 may make a request for a data value that it calls "net worth". A data source 104 may be identified as having the data to satisfy the request made by the data receiver 102, however, the data source 104 may call that same number "total assets". The request translator must recognize that, although different names are used, the data source 104 and the data receiver 102 are referring to the same data entity.

It is currently preferred that name and context conflicts are determined through the use of an ontology in connection with the data context 108–118 mappings. An ontology is an overall set of concepts for which each data source 104 and data receiver 102 registers its values.

Figure 4:
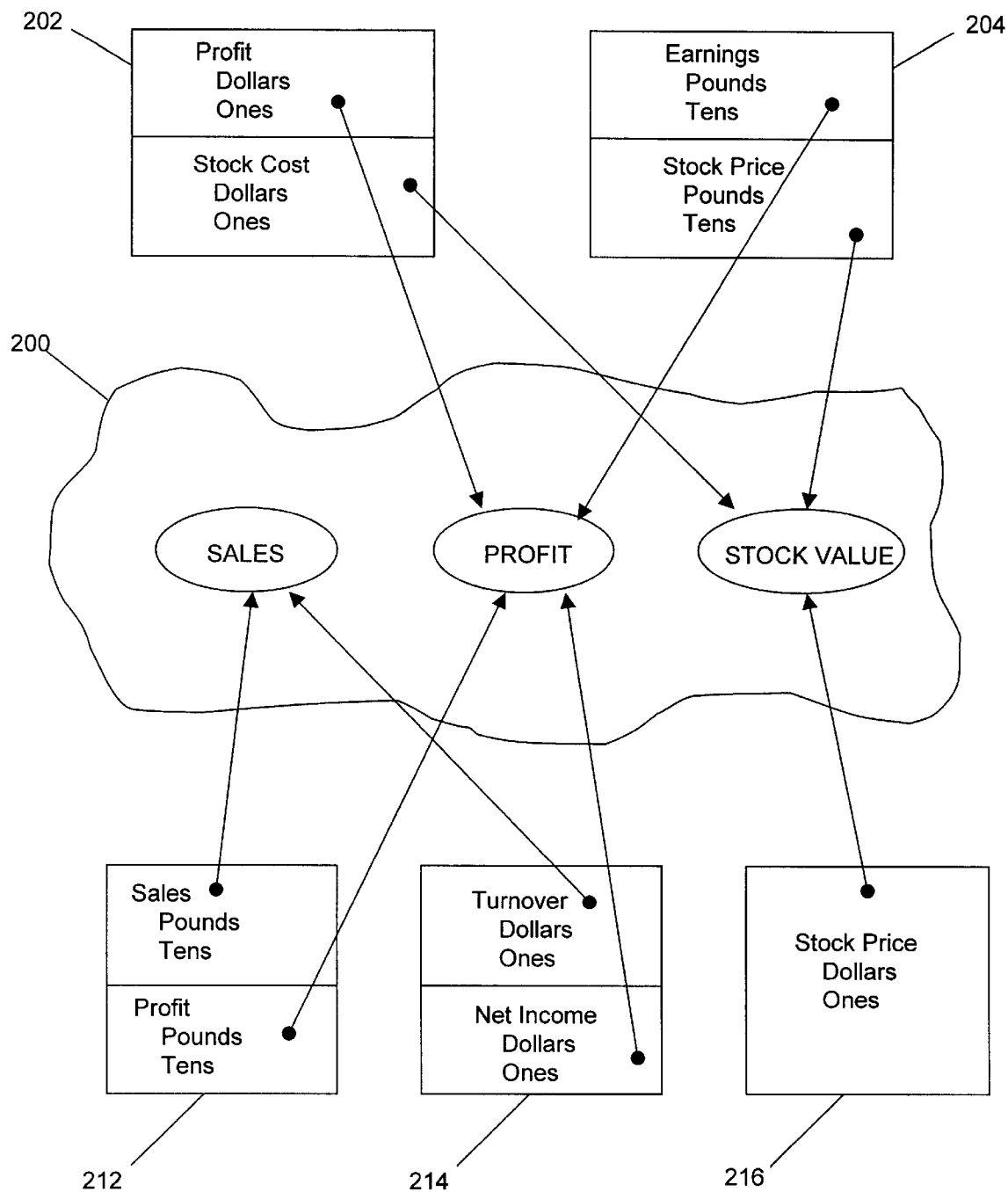
FIG. 4 is a diagram of an embodiment of an ontology as used by the system of FIG. 1.

Referring to FIG. 4, an example of a financial ontology 200 is shown. Nodes 102, 104 register context values for sales, profit, and stock value. A data source 104 may be registered by its system administrator or by a context registration service, or a user may register a particular data source 104 from which it desires to receive data. As shown in FIG. 4, a first user 202 and a second user 204 have registered with the financial ontology 200. The first user 202 registers that it uses the name "profit" for profit and "stock cost" for stock value. The second user 204 has registered that its name for the concept of profit in the financial ontology 200 is "earnings" and it calls stock value by the name "stock price"Each user 202, 204 is a possible data receiver 102, and is attached to the network 106. In much the same way, data sources 104 register, or are registered. For example, a first data source 212 has registered that it can provide data which it calls "sales" and "profit", which map to ontology 200 values of sales and profit. A second data source 214, in contrast, provides a "turnover" datum which maps to sales in the financial ontology 200 and a "net income" datum which matches to profit in the financial ontology 200.

Figure 5:
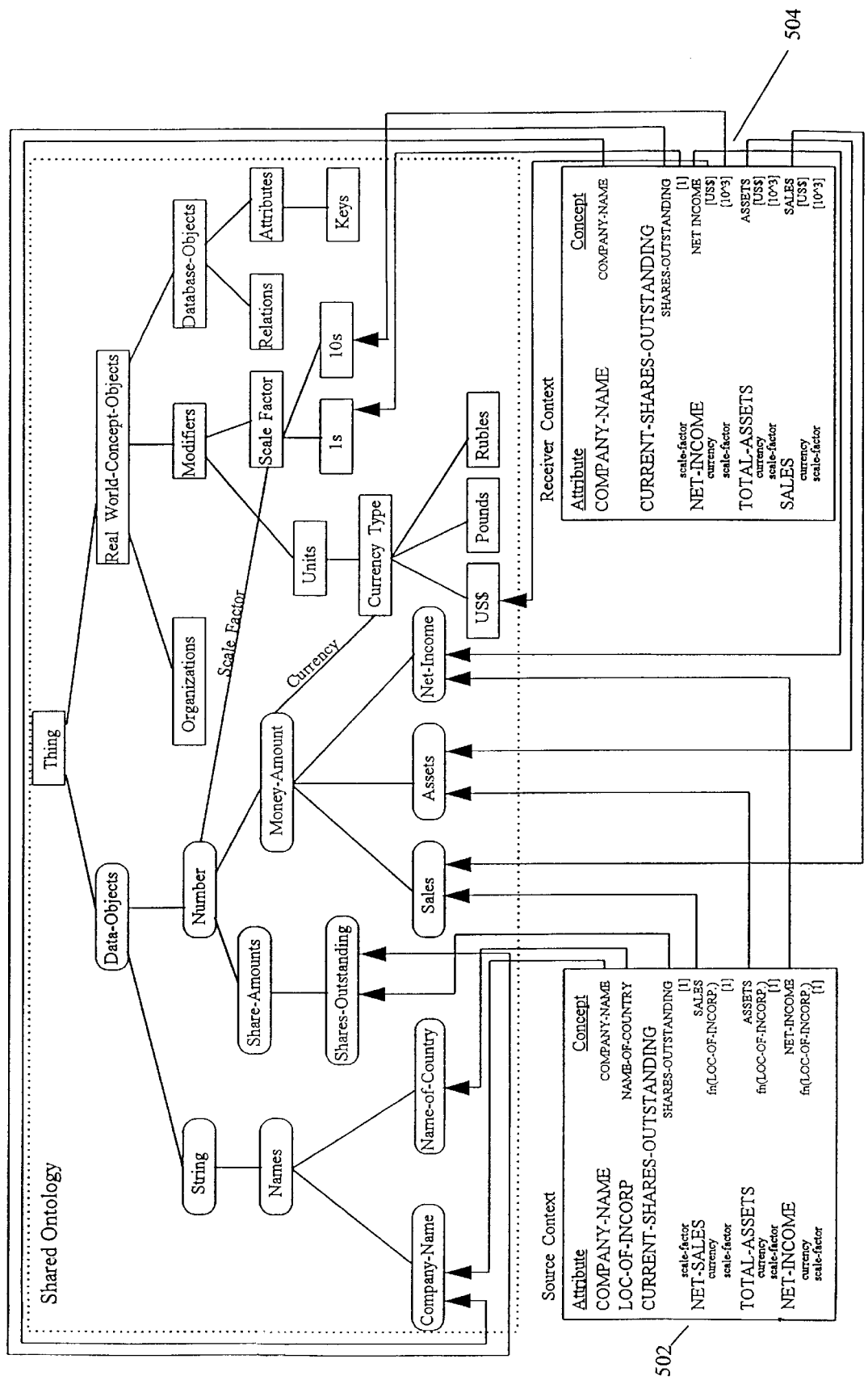
FIG. 5 is a diagram of an embodiment of an ontology showing examples of data contexts.

The ontology may exist as a file 502,504 which has entries for each node 102, 104 corresponding to shared concepts in the ontology 200, shown in FIG. 5. Entries in an ontology may be attributes. For example, an entry may specify that if sales figures are desired from the first data source 212, request data using the name "sales". Alternatively, entries might be meta-attributes or links. For example, an entry may specify that if sales figures are desired from the first data source 212, access a specified location. Entries may also specify data context based on another entry in the ontology. For example, an ontology may define the currency context for reporting financial data based on the location of the company. Referring to the source data context 502 in FIG. 5, NET-SALES for French companies have a currency context of Francs, while German companies expect or provide NET-SALES in units of Marks. Ontologies may be distributed over the network 106 on multiple nodes 102, 104. Alternatively, all ontologies may reside on a single node 102, 104 connected to the network 106 for the purpose of providing a library of ontologies.

A step that the request translator takes before actually querying the data source 104 is to detect any conflicts in the names used by the data receiver 102 and the data source 104 (step 306). For example, when the request translator initially receives a request from the first user 202 for companies having "profit" and "stock cost" in excess of some value, it must detect any conflicts in the names used by the first user 202 and the data source 104. Assuming that the first user 202 specifies the second data source 214 as the source 104 from which data should be retrieved, the request translator must recognize that when the first user 202 requests "profit", user 202 is seeking profit which is represented by "turnover" in the second data source 214. Similarly, when the first user 202 requests data regarding "stock cost", that data maps to stock value in the financial ontology 200 for which the second data source 214 has not registered. Thus, the request translator would return a message that the second data source 214 cannot satisfy the entire data request made by the first user 202.

Another step that the request translator takes before actually querying the data source 104 is to detect conflicts in the data context 108 associated with the data receiver 102 and the data source 104 (step 308). For example, the second user 204 in FIG. 4 expects to receive "earnings" and "stock price" values in units of tens of pounds, while the first user 202 expects to receive "profit" and "stock cost" data in units of ones of dollars. Thus, when the second user 204 requests "earnings" and specifies that the second data source 214 should be used, the request translator detects the conflict between what the second user 204 calls "earnings" and what the second data source 214 calls "net income", because both of those data names map to "profit" in the financial ontology 200. The request translator also detects the context conflict between the second user 204 and the second data source 214. The second user 204 expects to receive data in tens of pounds, while the second data source 214 expects to give data in terms of ones of dollars. The request translator translates the request made by the second user 204 for "earnings" in units of tens of pounds to a query directed to the second data source 214 for "net income" in units of ones of dollars.

When the request is translated into a query, the meaning ascribed to data by separate nodes 102, 104 can be taken into account. For example, data source 212 may provide "profit" data which excludes extraordinary expenses. However, the first user 202 may desire "profit" data including extraordinary expenses. The ontology 200 may provide a default translation for this difference in meaning, or the first user 202 may provide a translation which overrides the default translation.

Other translations may be inferred from entries in the ontology. For example, currency values for a given ontology may be inferred from a location entry. Thus, data receivers 102 located in England may be assumed to desire financial data in pounds. The ontology may provide for translations between these units. These assumptions may be overridden by a particular data receiver 102 or data source 104, as described below.

Figure 3:
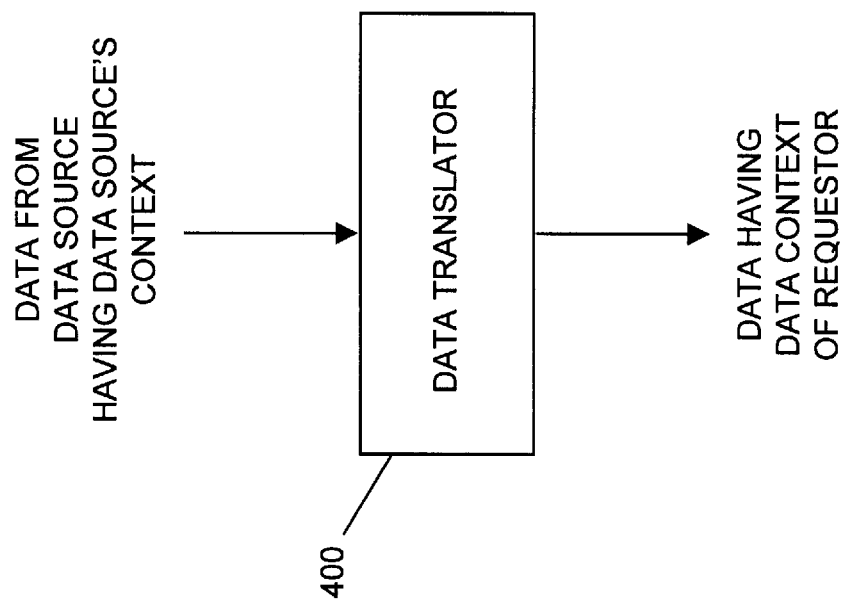
FIG. 3 is a diagram of a data translator according to the invention.

Referring to FIG. 3, a data translator 400 receives data from the data sources 104 that are queried. Since a conflict between the data context 108, 112, 114, 116 of the data receiver 102 and the data context 110, 118 of the data source 104 has already been detected, the data received from the data source 104 is translated to match the data context 108 that the data receiver 102 expects. Once translated, the received data is in a form the data receiver 102 expects, and the request made by the data receiver 102 is satisfied.

The translations effectuated by the request translator and the data translator may be accomplished by using pre-defined functions, look-up tables, or database queries among other well-known techniques. For example, when the "net income" datum must be translated by the request translator, it may request the exchange rate from dollars to pounds from an appropriate currency database and then use that exchange rate to translate the received datum. In some embodiments, the ontology 200 provides a set of default translations for the request translator and data translator to use. These default translations may, however, be overridden by a data receiver 102 or data source 104 that prefers a different translation to be used. For example, an ontology 200 may provide a default translation between tens of pounds and ones of dollars that uses a pre-defined function to multiply data in pounds by 6.67. Alternatively, the conversion can be done as a number of steps. For example, the ontology may provide a conversion from dollars to pounds and a conversion from tens to ones which are applied in succession to the data. A particular data receiver 102 may not desire such a rough estimate, however, and may therefore provide its own translation in its data context 108–118 which overrides the default translation provided by the ontology 200.

The request translator may query the data source 104 for the data receiver 102. In these embodiments, the request translator may optimize the query (step 310) using any well-known query optimization methods, such as Selinger query optimization. Alternatively, the request translator may separate a query into several separate sub-queries and direct those sub-queries to one data source 104 or multiple data sources 104. In another embodiment, the request translator simply passes the query to a query transmitter which may also optimize the query or separate the query into several sub-queries, as described above.

In some embodiments, the data receiver 102 does not specify which data source 104 to use in order to retrieve the data. For example, in FIG. 4 the second user 204 may simply request a list of all the companies having "earnings " in excess of some number of pounds, and a "stock price " below a certain number of pounds. The request translator determines if such a request may be satisfied (step 304). Since the second user 204 has registered that "earnings " are equivalent to profit in the financial ontology 200 and that "stock price " is equivalent to "stock value" in the financial ontology 200, the request translator may then determine if any data sources 104 have also registered with the financial ontology 200 as providing those values.

The request translator is able to determine that the first data source 212 and the second data source 214 have both registered with the financial ontology as providing a "profit " datum while the third data source 216 has registered with the financial ontology as providing a "stock value " datum. The request translator may separate the request into two sub-queries, one for "stock price", which is directed to the third data source 216, and one for "earnings".

At this point, the request translator may further optimize the query by selecting to which data source the request for "earnings " should be directed (step 310). The first data source 212 has registered with the financial ontology as providing a "profit " datum, called "profit " by the first data source 212, in tens of pounds, while the second data source 214 has registered with the financial ontology as providing a "profit " datum, called "net income " by the second data source 214, in ones of dollars. Since the second user 204 requested earnings in tens of pounds, if the query is directed to the second data source 214, no context conversion is necessary. Therefore, the request translator may choose to request the "profit " datum from the second data source 214 in order to further optimize the query.

However, the request translator may determine that the second data source 214 is unavailable for some reason. In such a case the request translator may direct the request for "profit " data to the first data source 212 by translating the request made by the second user 204 from tens of pounds into a query directed to the second data source 214 in ones of dollars. As described above, this translation may be done by a predefined function, a look-up table, or a database query.

Once the data sources are chosen and any context translation that is necessary is done, queries are submitted to the selected data sources 104. For example, a query could be submitted to the second data source 214, which requests all companies having a "profit " higher than a certain number of pounds, while a query is submitted to the third data source 216 requesting a list of all the companies having a "stock value " lower than a certain number of dollars. This is done by converting the request for "stock value " in tens of pounds to a query specifying "stock value " in ones of dollars. This allows the third data source 216 to efficiently process the request and return data. The returned data, of course, is in units of ones of dollars, and must be translated into units of tens of pounds before being presented to the data receiver 102 that makes the request.

Once the results of both queries are returned, those results must be "joined", which is a common merge routine in database arts. The join of the query results may be done by the request translator or it may be done by the data receiver 102 itself.

The data contexts 108–118 of a data source 104 and a data receiver 102, or two data sources 104, may be compared using the present invention. Independent from actual data retrieval, this comparison can be used to provide information on the differences, if any, between two contexts and what translations, if any, are necessary to exchange data between the data contexts. The differences or translations may be provided to a user as a file.

The present invention may be provided as one or more computer-readable programs embodied on or in one or more articles of manufacture. The article of manufacture may be a floppy disk, a hard disk, a CD ROM, a flash memory card, a PROM, a RAM, a ROM, or a magnetic tape. In general, the computer-readable programs may be implemented in any programming language. It is preferred that the language used have good text-handling capabilities such as, for example, LISP, PERL, C++, or PROLOG. The software programs may be stored on or in one or more articles of manufacture as object code.

Having described certain embodiments of the invention, it will now become apparent to one of skill in the art that other embodiments incorporating the concepts of the invention may be used. Therefore, the invention should not be limited to certain embodiments, but rather should be limited only by the spirit and scope of the following claims.

What is claimed is:

1. A system for querying heterogeneous data sources distributed over a network, said system comprising:

a plurality of heterogeneous data sources, each of which includes local information relating to a first semantic data context associated with the heterogeneous data source;

a request translator associated with each requestor, said request translator receiving a request having a second semantic data context and comparing said first semantic data context and said second semantic data context to determine if a conflict between those contexts exists, said request translator translating the request, responsive to the conflict determination, into a query having at least one semantic data context associated with at least one of the heterogeneous data sources; and a data translator which translates received data from the semantic data contexts associated with the heterogeneous data sources into the semantic data context associated with the request.

2. The system of claim 1 wherein the request is received by said request translator.

3. The system of claim 1 wherein the request is generated by said request translator.

4. The system of claim 1 wherein said request translator determines at least one heterogeneous data source to query based on the request.

5. The system of claim 4 wherein said request translator determines at least one heterogeneous data source to query based on an ontology.

6. The system of claim 4 wherein said request translator detects a difference between the semantic context of data requested by the request and the semantic context of data supplied by the data source and converts the semantic data context of the request into the semantic data context of the data source.

7. The system of claim 6, wherein the conversion is accomplished by a pre-defined function, a look-up table, or a database query.

8. The system of claim 1 wherein said request translator optimizes the query.

9. The system of claim 1 further comprising a query transmitter which queries at least one of the heterogeneous data sources using the query.

10. The system of claim 9 wherein said query transmitter optimizes the query.

11. The system of claim 9 wherein said query transmitter separates the query into a plurality of sub-queries and queries at least one of the heterogeneous data sources using the sub-queries.

12. The system of claim 11 wherein the query transmitter queries a different data source with each one of the sub-queries.

13. The system of claim 1 wherein said data translator translates received data into the semantic data context of the request using a pre-defined function, a look-up table, or a database query.

14. A method for querying heterogeneous data sources over a network, said method comprising the steps of:
   (a) accessing a plurality of heterogeneous data sources to be queried, each of which includes local information relating to a first semantic data context associated with the heterogeneous data source;
   (b) receiving a request having a second semantic data context and comparing said first semantic data context and said second semantic data context to determine if a conflict between those contexts exists;
   (c) translating the request responsive to the conflict determination into a query having at least one semantic data context associated with the at least one of the heterogeneous data sources; and
   (d) translating received data from the first semantic data contexts associated with each of the heterogeneous data sources into the second semantic data context associated with the request.

15. The method of claim 14 further comprising the step of receiving a request before step (a).

16. The method of claim 14 further comprising the step of generating a request before step (a).

17. The method of claim 14 further comprising before step (a) the step of determining at least one heterogeneous data source to query based on the request.

18. The method of claim 17 further comprising before step (b) the step of determining at least one heterogeneous data source to query based on an ontology.

19. The method of claim 17 further comprising the steps of:
   detecting a difference between the semantic context of data requested by the request and the semantic context of data supplied by the data source to be queried; and
   converting the semantic data context of the request into the semantic data context of the data source.

20. The method of claim 19 wherein the semantic data context of the request is converted into the semantic data context of the data source using a pre-defined function, a look-up table, or a database query.

21. The method of claim 14 further comprising before step (b) the step of optimizing the query.

22. The method of claim 14 further comprising the step of querying at least one of the disparate data sources using the translated request.

23. The method of claim 22 wherein said optimization step further comprises:
   separating the query into a plurality of sub-queries; and
   querying at least one of the heterogeneous data sources using the sub-queries.

24. The method of claim 23 wherein said querying step further comprises querying a different data source with each one of the sub-queries.

25. The method of claim 14 wherein step (b) further comprises translating received data into the semantic data context of the request using a pre-defined function, a look-up table, or a database query.

26. An article of manufacture having computer-readable program means for querying heterogeneous data sources over a network embodied thereon, the article comprising:
   computer-readable program means for accessing a plurality of heterogeneous data sources to be queried, each of which includes local information relating to semantic data context associated with the heterogeneous data source;
   computer-readable program means associated with each requestor for translating a request having an associated semantic data context into a query having at least a second semantic data context associated with the at least one of the heterogeneous data sources; and
   computer-readable program means for translating received data from the semantic data contexts associated with the heterogeneous data sources into the semantic data context associated with the request.

27. The article of manufacture of claim 26 further comprising computer-readable program means for receiving a request.

28. The article of manufacture of claim 26 further comprising computer-readable program means for generating a request.

29. The article of manufacture of claim 26 further comprising computer-readable program means for determining at least one heterogeneous data source to query based on the request.

30. The article of manufacture of claim 29 wherein the determination of at least one heterogeneous data source to query is based on an ontology.

31. The article of manufacture of claim 29 further comprising:
   computer-readable program means for detecting a difference between the semantic context of data requested by the request and the semantic context of data supplied by the data source; and
   computer-readable program means for converting the semantic data context of the request into the semantic data context of the data source.

32. The article of manufacture of claim 31 wherein said computer-readable program means for converting the semantic data context of the request into the semantic data context of the data source comprises a pre-defined function, a look-up table, or a database query.

33. The article of manufacture of claim 26 further comprising computer-readable program means for optimizing the query.

34. The article of manufacture of claim 26 further comprising computer-readable program means for transmitting the query to at least one of the heterogeneous data sources.

35. The article of manufacture of claim 26 further comprising computer-readable program means for optimizing the query.

36. The article of manufacture of claim 26 further comprising computer-readable program means for separating the query into a plurality of sub-queries and computer-readable program means for querying at least one of the heterogeneous data sources using those sub-queries.

37. The article of manufacture of claim 26 further comprising computer-readable program means for querying a different data source with each one of the sub-queries.

38. The article of manufacture of claim 26 wherein said computer-readable program means for translating received data into the semantic data context of the request comprises a pre-defined function, a look-up table, or a database query.

* * * * *

UNITED STATES PATENT AND TRADEMARK OFFICE
CERTIFICATE OF CORRECTION

PATENT NO. : 5,953,716
DATED : September 14, 1999
INVENTOR(S) : Madnick et al.

It is certified that error appears in the above-identified patent and that said Letters Patent is hereby corrected as shown below:

<u>Title page,</u>
After item [76], insert -- [73] Assignee:

-- "Massachusetts Institute of Technology, Cambridge, MA." --.

Signed and Sealed this

Twenty-first Day of August, 2001

Attest:

*Nicholas P. Godici*

NICHOLAS P. GODICI
*Attesting Officer*    *Acting Director of the United States Patent and Trademark Office*